(12) United States Patent
Fong et al.

(10) Patent No.: US 8,509,812 B2
(45) Date of Patent: Aug. 13, 2013

(54) METHOD AND SYSTEM FOR COLLECTING AUTOMOBILE-RELATED TRAVEL DATA WITH A SMARTPHONE

(75) Inventors: Gary Fong, Milpitas, CA (US); Christopher P. Ricci, Saratoga, CA (US)

(73) Assignee: Flextronics AP, LLC, Broomfield, CO (US)

( * ) Notice: Subject to any disclaimer, the term of this patent is extended or adjusted under 35 U.S.C. 154(b) by 44 days.

(21) Appl. No.: 13/338,078

(22) Filed: Dec. 27, 2011

(65) Prior Publication Data

US 2013/0165137 A1    Jun. 27, 2013

(51) Int. Cl.
     *H04W 24/00*      (2009.01)
     *H04M 3/00*      (2006.01)

(52) U.S. Cl.
     USPC ........ 455/456.1; 455/418; 455/423; 701/33.2

(58) Field of Classification Search
None
See application file for complete search history.

(56) References Cited

U.S. PATENT DOCUMENTS

| | | | |
|---|---|---|---|
| 6,629,050 B2 | 9/2003 | Modgil | |
| 2008/0255888 A1 | 10/2008 | Berkobin et al. | |
| 2009/0051566 A1* | 2/2009 | Olsen et al. | 340/825.49 |
| 2009/0109037 A1 | 4/2009 | Farmer | |
| 2010/0131304 A1* | 5/2010 | Collopy et al. | 705/4 |
| 2011/0093161 A1 | 4/2011 | Zhou et al. | |
| 2011/0112717 A1* | 5/2011 | Resner | 701/33 |
| 2011/0125363 A1 | 5/2011 | Blumer et al. | |
| 2011/0196571 A1* | 8/2011 | Foladare et al. | 701/33 |
| 2012/0323772 A1* | 12/2012 | Michael | 705/39 |

OTHER PUBLICATIONS

"ESCORT Entourage CIS Product Overview"; Blackline GPS; http://www.blacklineautomotive.com/products/escort-entourage-cis/index.html.
"Delphi's New Key Fob Technology Helps Make Smart Phone Connectivity Available at Low Cost"; http://delphi_com/news/pressReleases/pressReleases_2010/pr_2010_04_13_004/?print=1; Apr. 13, 2010; p. 1-2.
"New Key Fob Uses Field Communication to Enhance Convenience While Helping Ensure Security of Data Exchange"; http://delphi.com/news/pressReleases/pressReleases_2010/pr_2010_06_18_002/?print=1; Jun. 18, 2010; p. 1-2.
"ESCORT Entourage CIS Key Features"; Blackline GPS; http://www/blacklinegps.com/products/escort-entourage-cis/features.html.
Alisa Priddle; "Key Fob Morphs into High-Tech Wonder"; http://www.gminsidenews.com/forums/f12/key-fob-morphs-into-high-tech-wonder-92636/; Jun. 9, 2010; p. 1-9.
"BlipPlus"; http://itunes.apple.com/us/app/blipplus/id354758392?mt=8; Blackline GPS; Apr. 26, 2010; p. 1-3.
"Blackline GPS Recovery & Monitoring Service"; http://www/blacklinegps.com/products/escort-entourage-cis/recovery-monitoring.html; Blackline GPS.

* cited by examiner

*Primary Examiner* — Erika A Washington

(57) ABSTRACT

A technique for collecting automobile-related travel data is disclosed. The technique involves initiating a travel data collection function of a smartphone in response to a stimulus that emanates from an automobile. Once the travel data collection function has been initiated, automobile-related travel data is collected using a location detection function of the smartphone and then the travel data is communicated from the smartphone to a recipient according to a travel distribution function of the smartphone.

17 Claims, 7 Drawing Sheets

METHOD AND SYSTEM FOR COLLECTING AUTOMOBILE-RELATED TRAVEL DATA WITH A SMARTPHONE

BACKGROUND

There are various instances in which it is desirable to be able to track the travel of an automobile. For instance, an insurance provider may want to aggregate automobile travel data across its client base to identify risk trends and/or to set individual policy rates. Additionally, parents may want to track the automobile travel of their children.

There are various known systems for tracking the travel of automobiles, many of which are integrated into automobiles at the time of manufacture or hardwired into the automobiles as aftermarket add-ons. For example, automobiles can be equipped with on-board GPS systems to collect travel data. Automobiles can also be equipped with on-board transmission systems to distribute the travel data to other entities (e.g., insurance companies, location tracking servers, parents, etc.). Although these on-board systems work well, they add cost and complexity to the automobiles.

A smartphone has the ability to collect and distribute travel data, including travel data that is collected by the smartphone while the user of the smartphone is traveling in an automobile. Typically, the collection and distribution of travel data is controlled by a software application, referred to as a "mobile application," an "application," or simply as an "app," which is downloaded to and actively running on the smartphone. Using such an app, travel data can be collected and distributed as long as the app is running on the smartphone. The functions of data collection and distribution require operations that consume battery power. However, battery power in a smartphone is a limited and valuable resource that should be conserved as much as possible. Therefore, if a smartphone is used to collect and distribute travel data, then it is desirable to have the data collection and distribution functions operate only when the user (and the user's smartphone) is traveling in an automobile. However, it is inconvenient and cumbersome to require the user to launch a data collection and distribution application in the smartphone each time the user enters an automobile.

SUMMARY

In accordance with an embodiment of the invention, a technique for collecting automobile-related travel data involves initiating a travel data collection function of a smartphone in response to a stimulus that emanates from an automobile. Once the travel data collection function has been initiated, automobile-related travel data is collected using a location detection function of the smartphone. Then the travel data is communicated from the smartphone to a recipient according to a travel distribution function of the smartphone.

In an embodiment, the stimulus that emanates from the automobile is an electromagnetic field (EMF) or a series of sound waves that is generated from the ignition operation of an automobile. In another embodiment, the stimulus that emanates from the automobile is a radio frequency (RF) signal that is generated by an on-board communications system, such as a Bluetooth communications system. In another embodiment, the stimulus that emanates from the automobile is an RF signal that is generated from an on-board device such as a beacon, a radio frequency identification (RFID) tag, or a near field communications (NFC) tag. In each of these instances, the stimulus that emanates from the automobile provides a non-intrusive and/or passive trigger for launching a data collection and distribution function of a smartphone that requires little or no effort on the part of the smartphone user and that corresponds to a time when the smartphone user (and the smartphone) is near to or inside the cabin of the automobile.

Other aspects and advantages of embodiments of the present invention will become apparent from the following detailed description, taken in conjunction with the accompanying drawings, illustrating by way of example, the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
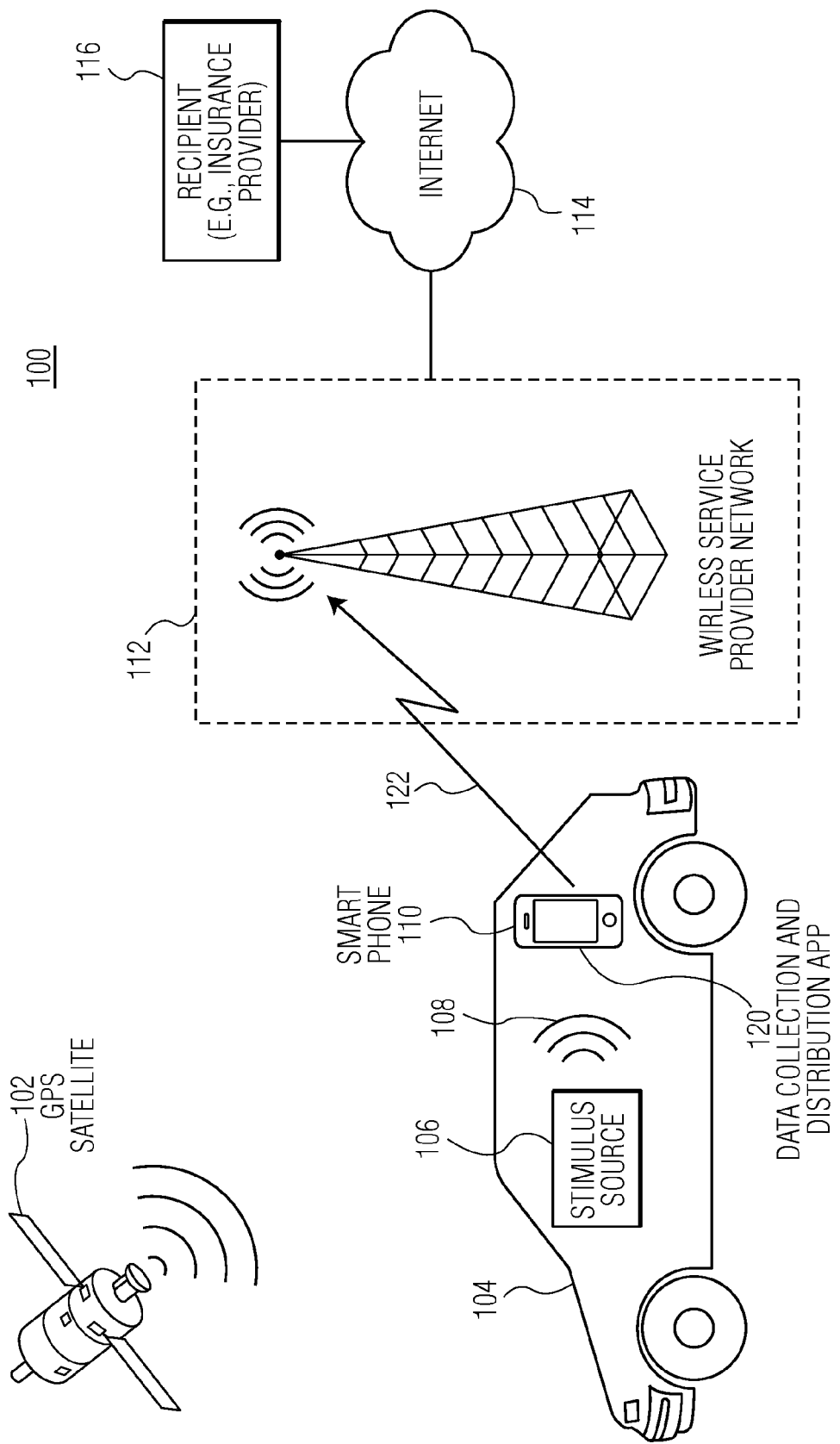
FIG. 1 depicts a system in which a technique for collecting and distributing automobile-related travel data can be implemented.

FIG. 1 depicts a system 100 in which a technique for collecting and distributing automobile-related travel data can be implemented. The system includes a GPS satellite 102, an automobile 104 that has a stimulus source 106, a smartphone 110 (which may be carried by a person that is traveling in the car), a wireless service provider network 112, the Internet 114, and a recipient 116, such as an insurance provider. The GPS satellite, the wireless service provider network, the Internet, and the insurance provider are known entities that are described briefly below.

A brief description of a technique for collecting and distributing automobile-related travel data in accordance with an embodiment of the invention is described first, followed by a more in-depth description of the individual elements of the system and various alternative embodiments.

In general, the automobile 104 depicted in FIG. 1 includes a stimulus source 106 that generates a stimulus 108. The stimulus source and the corresponding stimulus may be, for example, an ignition system of the automobile that generates an EMF and/or a series of sound waves upon ignition, an on-board communications system (e.g., a Bluetooth communications system) that generates RF signals, an on-board beacon that generates an RF signal, an RFID tag that generates an RF signal, or an NFC tag that generates an RF signal. Although some examples of the stimulus source and a corresponding stimulus have been provided, other stimulus sources and corresponding stimuli that emanate from an automobile may be used to initiate a data collection and distribution app of a smartphone.

In FIG. 1, the smartphone 110 is illustrated as being within the boundary of the automobile 104. This is meant to represent a situation in which the user of the smartphone (not shown) has entered the automobile along with his/her smartphone. Although not shown in FIG. 1, in many cases, the smartphone acts as a proxy for the user in that the presence of the smartphone is assumed to correspond to the presence of its user. Although in most cases it is assumed that the smartphone and the user are located in close proximity to each other, this is not a requirement for carrying out the technique for collecting and distributing automobile-related travel data as described herein. Further, although the smartphone is illustrated as being within the boundary of the automobile, the technique for collecting and distributing automobile-related travel data described herein may be implemented when the smartphone is within the cabin of the automobile or when the smartphone is in close proximity to the automobile, but not actually within the cabin of the automobile.

As illustrated in FIG. 1, the smartphone 110 includes a data collection and distribution application 120, referred to herein simply as the "App," which is configured to implement the collection of travel data and the distribution of the travel data to the recipient 116, such as an insurance provider, as designated by the App. In an embodiment, the App is resident on the smartphone but does not implement the data collection and distribution functions unless the App is actively running on the smartphone.

In accordance with an embodiment of the invention, the App 110 of the smartphone is initiated in response to a stimulus 108 that emanates from the stimulus source 106 of the automobile 104. In an embodiment, initiating the App involves retrieving stored computer readable instructions that are specific to the App from a persistent memory of the smartphone and executing at least a portion of the computer readable instructions on a microcode processor, "microprocessor," of the smartphone. There are various ways in which the stimulus can initiate the App, examples of which are described below.

Once the App 120 is initiated and running in the smartphone 110, automobile-related travel data is collected by the smartphone using, for example, a GPS receiver within the smartphone. The travel data may be collected and distributed in various forms, including, for example, travel locations, travel distances, travel speeds, travel dates, travel times, and travel durations. The collected automobile-related travel data is then communicated to a recipient (e.g., an insurance provider) as directed by the App. The App may communicate the automobile-related travel data to the insurance provider in real-time via the wireless service provider network 112 (as indicated by arrow 122) or the App may accumulate the travel data and communicate the accumulated travel data to the insurance provider via a Wi-Fi connection once a Wi-Fi connection is established. The recipient can use the automobile-related travel data in accordance with its own specific needs. For example, an insurance carrier may use the automobile-related travel data to identify risk trends and/or to set individual policy rates. In another example, a parent may use the automobile-related travel data to keep tabs on a child. Other uses of the automobile-related travel data are possible.

As mentioned above, there are various ways in which the stimulus 108 that emanates from the automobile 104 can be utilized to initiate the App 120 in the smartphone 110. FIGS. 2-6 depict different embodiments of systems that are configured to initiate the App in response to a stimulus that emanates from the automobile. The systems can vary, for example, depending on the source of the stimulus and/or depending on the technique that is used to detect the stimulus. In each case, initiation of the App is physically and temporally linked to the automobile because the stimulus emanates from the automobile. A stimulus that emanates from the automobile may be, for example, a stimulus that is generated by the automobile, a stimulus that originates from the automobile, a stimulus that spreads out from the automobile, a stimulus that is produced by the automobile, and/or a stimulus that is sent forth from the automobile.

Figure 2:
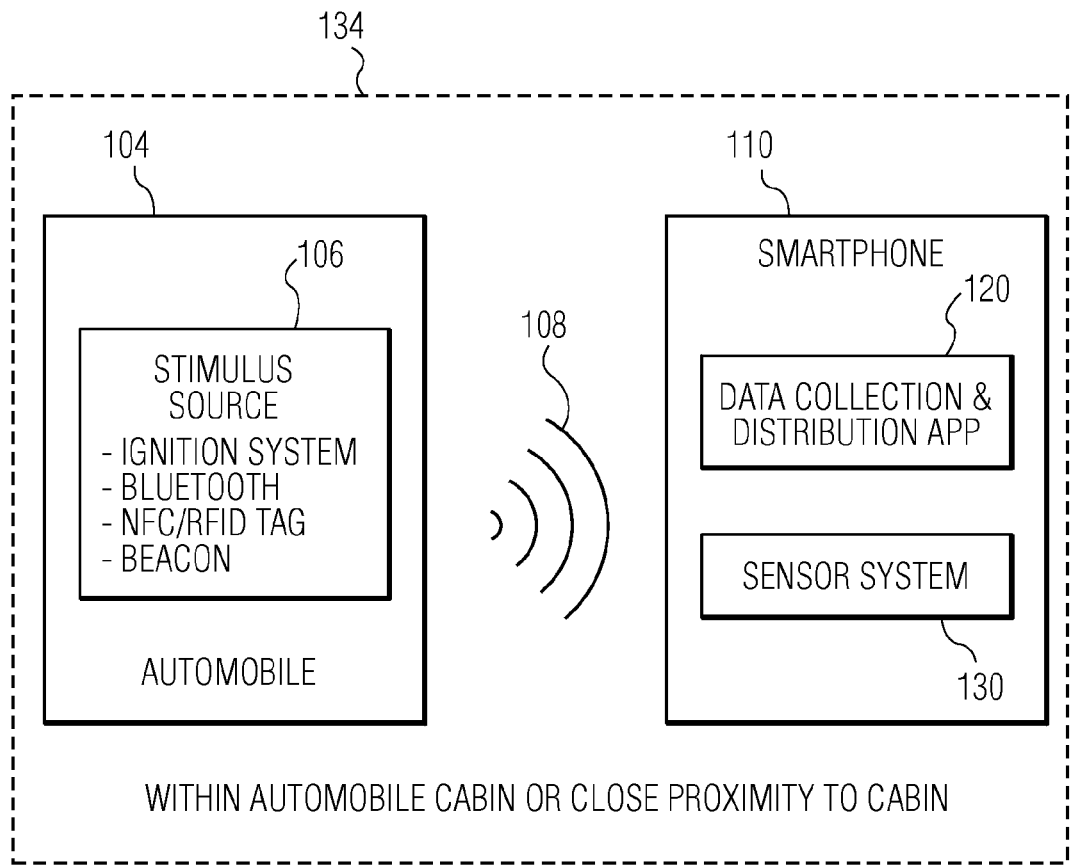
FIG. 2 illustrates a system in which a stimulus is detected directly by a sensor system in a smartphone.

FIG. 2 illustrates a system in which the stimulus 108 is detected directly by a sensor system 130 in the smartphone 110. In one embodiment, the stimulus source 106 is an ignition system of the automobile 104 and the stimulus is an EMF that is generated upon startup of the automobile. For example, the EMF is generated as a result of electrical power that is applied to the starter motor. In an embodiment, the EMF has a particular signature or fingerprint (e.g., frequency, magnitude, and/or duration) that can be characterized and recognized by the smartphone. In addition to the EMF, the ignition system of the automobile and/or the ignition operation generates a series of sound waves, manifested as sound, upon startup. For example, the sound is generated as a result of friction between mechanical parts of the automobile that are set in motion by the ignition system and from operation of a combustion engine. In an embodiment, the sound has a particular signature or fingerprint (e.g., frequency, magnitude, and/or duration) that can be characterized and recognized by the smartphone. In the case where the stimulus source is the ignition system and/or the ignition operation, the smartphone can be equipped with a sensor system that is capable of detecting and recognizing the EMF or the sound. In an embodiment, an antenna and sensor logic of the smartphone are used to detect and recognize the EMF that is generated by the ignition system. In another embodiment, a microphone and sensor logic of the smartphone are used to detect and recognize the sound that is generated by the ignition system and/or the ignition process. In an embodiment, the sensor system goes through an initialization or learning process to learn the particular signature of the stimulus. The signature of the stimulus is then stored by the sensor system and used in a comparison process to identify a subsequently detected stimulus as a stimulus that should initiate the App.

Once the sensor system 130 has detected and recognized the EMF or sound that is generated by the ignition system and/or by the ignition process, the sensor system generates a signal that either directly or indirectly initiates the App 120. For example, the signal generated from the sensor system at least triggers the data collection function of the App. Once the App is initiated and running on the smartphone, the data collection and distribution functions are implemented according to the App.

In another embodiment, the stimulus source 106 is an on-board short-range communications system, such as a Bluetooth communications system, and the sensor system 130 of the smartphone 110 includes an RF receiver and sensor logic. When in operation, the on-board communications system generates RF signals, for example, as part of a synchronization process with other similarly enabled devices (e.g., a Bluetooth enabled smartphone). If the smartphone is within the cabin of the automobile 104 or in close proximity to the automobile (as indicated by dashed box 134), the sensor system of the smartphone receives the RF signals, recognizes the RF signals as app-triggering signals, and generates a signal that either directly or indirectly initiates the App. Once the App is initiated and running on the smartphone, the data collection and distribution functions are implemented according to the App.

In another embodiment, the stimulus source 106 is a contactless data communications tag, referred to herein as a "tag," such as an RFID or NFC tag and the sensor system 130 of the smartphone 110 includes a tag reader. In an embodiment, the tag is affixed to a surface of the automobile 104, for example, as a sticker or magnet affixed within the cabin of the automobile. In another embodiment, the tag is installed as a component of the automobile at the time of manufacture.

As is known in the field, RFID tags may be effective at distances of at least 5 meters, which would enable RF communications between the RFID tag and the smartphone 110 upon the smartphone coming near to the automobile 104 or entering the cabin of the automobile. Because of the effective distance of RFID technology, the RFID tag can be located in or on the automobile such that it is not directly physically accessible to the smartphone. In operation, the App 120 could trigger the tag reader of the smartphone to periodically poll to see if an RFID tag is present. Upon the tag reader detecting the presence of an RFID tag, the App would be initiated.

In contrast to RFID technology, NFC technology requires the tag reader and NFC tag to be relatively close to each other, e.g., within about 4 cm. In this case, the NFC tag would be located in or on the automobile 104 in a location that is accessible to the smartphone 110 and the user would temporarily place the smartphone next to the NFC tag to initiate the App. For example, the NFC tag could be located in the door frame of the automobile or somewhere in the interior of the cabin that is readily accessible to the user. Upon entering the automobile, the user could swipe the tag with his/her smartphone and the communication between the NFC tag and the smartphone would be used to initiate the App. In an embodiment, NFC communications follow the ECMA-340 and ISO/IEC 18092 standards and/or the ECMA-352 and ISO/IEC 21481 standards.

Figure 3:
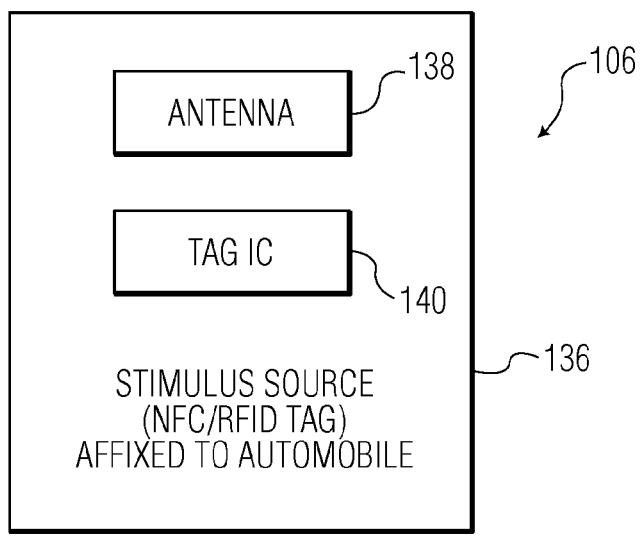
FIG. 3 depicts a stimulus source that is embodied as a contactless tag, which is affixed to or somehow integrated with an automobile.

FIG. 3 depicts a stimulus source 106 that is embodied as a contactless tag 136, such as an RFID tag or an NFC tag, which is affixed to or somehow integrated with the automobile 104. The tag includes an antenna 138 and a tag IC 140 as are known in the field of RFID and NFC communications. The tag can be integrated with, for example, a sticker or magnet and affixed to a surface within the cabin of the automobile. In an embodiment, the tag IC includes data that produces the stimulus 108 that is utilized to initiate the App 120. The data may be, for example, a pre-established initiation code. Additionally, the tag IC may include information that uniquely identifies the automobile, the insured entity, and/or the unique user. For example, the tag may include information that can be used to uniquely identify the automobile so that the travel data can be associated with the particular automobile. In the embodiment of FIG. 3, the tag does not include a battery. However, in other embodiments, the tag may include a power source such as a battery.

In another embodiment, the stimulus source 106 is a beacon that generates a signal that can be detected and recognized by the sensor system 130. The beacon may be included as a component of the automobile 104 at the time of manufacture or placed in or on the automobile as an aftermarket add-on. In an embodiment, the beacon generates an RF signal that can be detected and recognized by the sensor system. The beacon may tap into the electrical system of the automobile or may be battery powered. The beacon can be configured to transmit a signal at pre-established intervals or to transmit a signal upon startup of the automobile. In operation, the beacon transmits a signal that has some pre-established characteristic that when recognized by the sensor system, initiates the App 120 of the smartphone 110.

Figure 4:
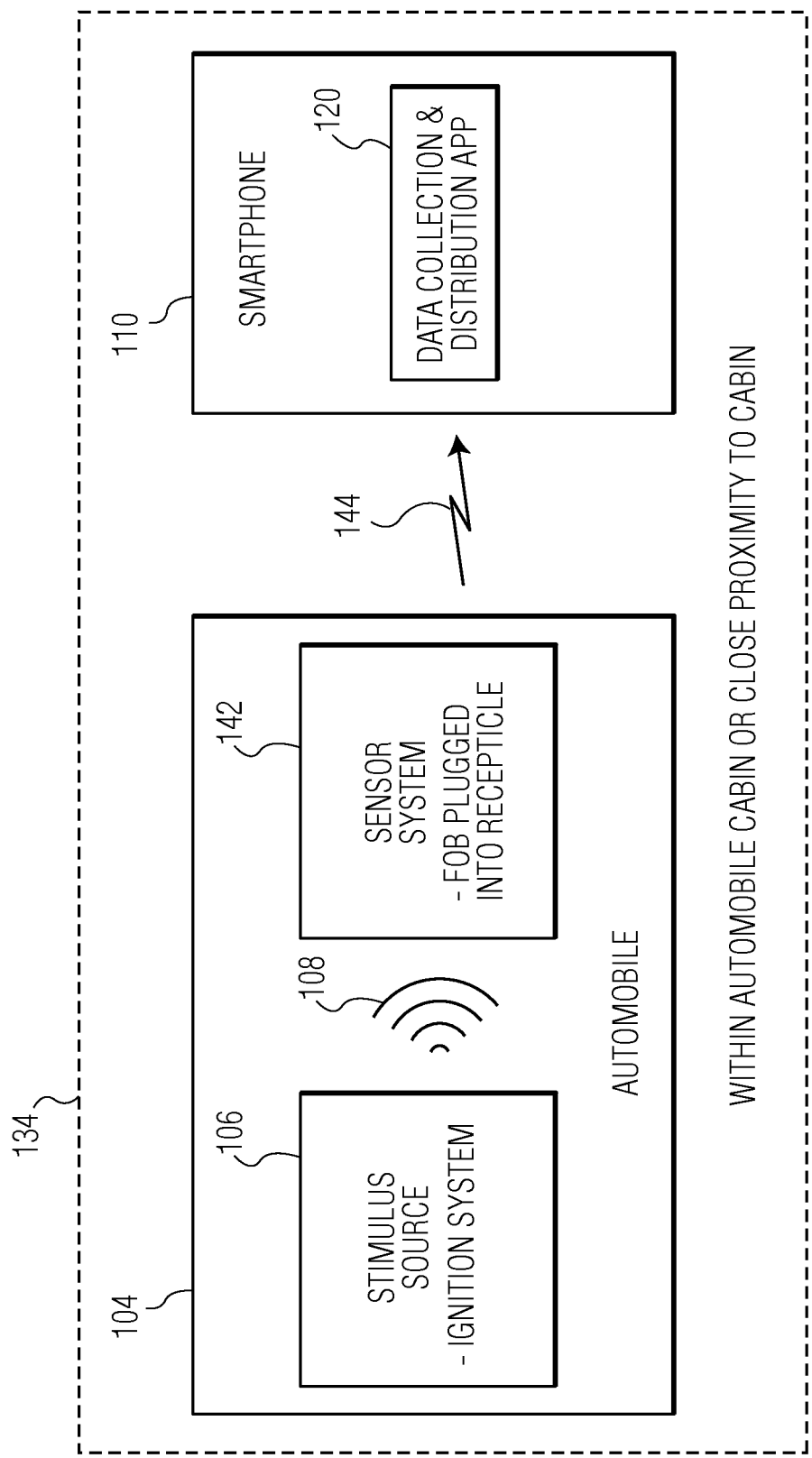
FIG. 4 illustrates a system in which a stimulus is detected by a sensor system that is external to a smartphone and in which an initiation signal is transmitted from the sensor system to the smartphone.

FIG. 4 illustrates a system in which the stimulus 108 is detected by a sensor system 142 that is external to the smartphone and in which an initiation signal 144 is transmitted from the sensor system to the smartphone 110. As illustrated in FIG. 4, the automobile 104 includes a stimulus source 106 and the sensor system 142, and the smartphone 110 includes the App 120. In the embodiment of FIG. 4, the stimulus source is an ignition system of the automobile that generates an EMF and/or a sound as the stimulus. The sensor system detects and recognizes the EMF or sound as a triggering stimulus and then transmits an RF signal to the smartphone to initiate the App. In an embodiment, the sensor system is a standalone device that is plugged into a receptacle of the automobile (e.g., a lighter receptacle, an AC port, or a USB port). The receptacle of the automobile is a power source that provides electrical power to the sensor system. Through the receptacle of the automobile, the sensor system is physically attached to the automobile.

Figure 5A:
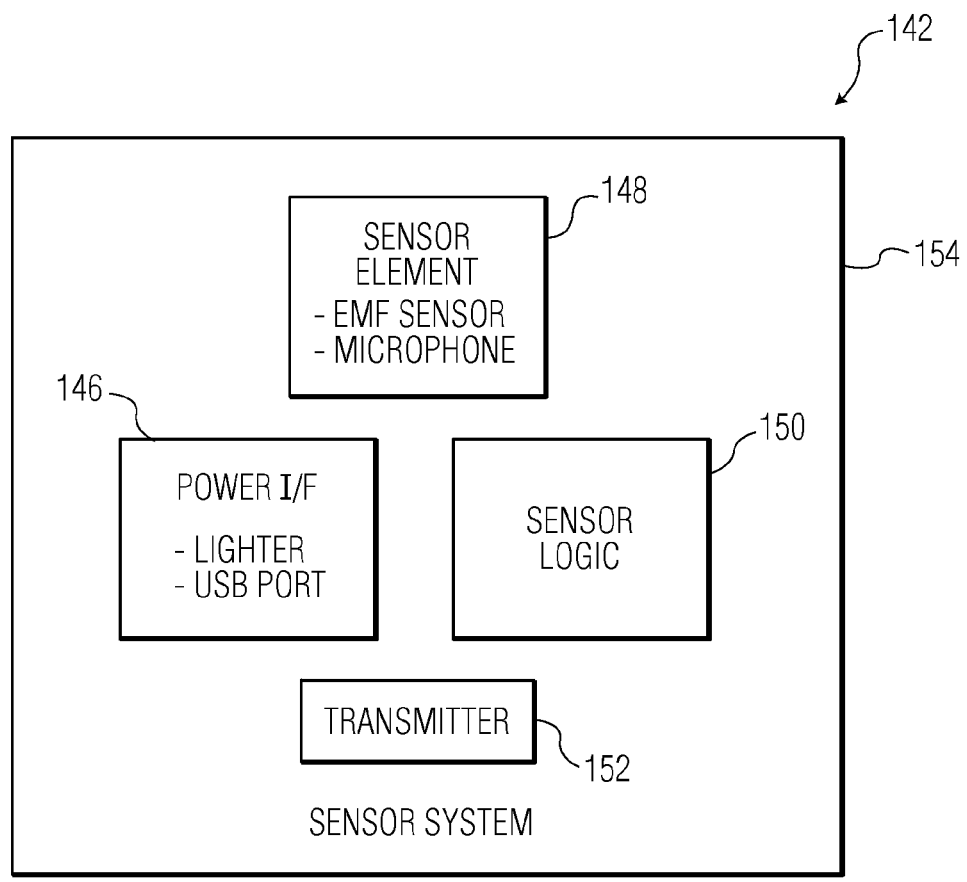
FIG. 5A depicts an expanded view of an embodiment of the sensor system of FIG. 4.

FIG. 5A depicts an expanded view of an embodiment of the sensor system 142 of FIG. 4. The sensor system includes a power interface 146, a sensor element 148, sensor logic 150, and a transmitter 152. In an embodiment, the power interface is an interface that connects to a receptacle of the automobile 104, such as a lighter receptacle, an AC port, or a USB port. The power interface of the sensor system provides electrical power to the sensor system components and can also be used to physically secure the sensor system to the automobile. In one embodiment, the sensor element is an RF receiver and in another embodiment, the sensor element is a microphone. In another embodiment, the sensor element is an electric transducer that can detect an EMF that is carried in the electrical system of the automobile and detected via the power receptacle. For example, the sensor element is a transformer tap or an inductive tap that can inductively detect an induced electrical current in the power receptacle. The sensor element, whether it is an RF receiver, a microphone, or some other type of sensor element, outputs a signal to the sensor logic in response to receiving the stimulus 108. The signal that is output to the sensor logic may be in the form of electrical current, voltage, etc. or in binary code. The signal is interpreted by the sensor logic and the sensor logic determines if the signal matches criteria for initiating the App 120. For example, the sensor logic determines if the signal matches a pre-established characteristic, signature, and/or fingerprint of the EMF or of the sound. In an embodiment, the pre-established characteristic, signature, and/or fingerprint is learned in a setup process. For example, the setup process involves inducing the stimulus and recording at least a portion of the stimulus as the signature and/or fingerprint. In an embodiment, the matching process involves comparing the amplitudes of specific frequencies of a sampled stimulus to determine if the sampled stimulus matches the pre-established characteristic, signature, and/or fingerprint. The sensor logic may be software/microcode, hardware, firmware, or a combination thereof.

If the sensor logic 150 determines that the expected stimulus 108 has been detected, then the sensor logic causes the transmitter 152 to transmit a signal 144 (FIG. 4) that directly or indirectly initiates the App 120. For example, the transmitter transmits an RF signal that can be received by the smartphone 110 and causes the smartphone to initiate the App.

Figure 5B:
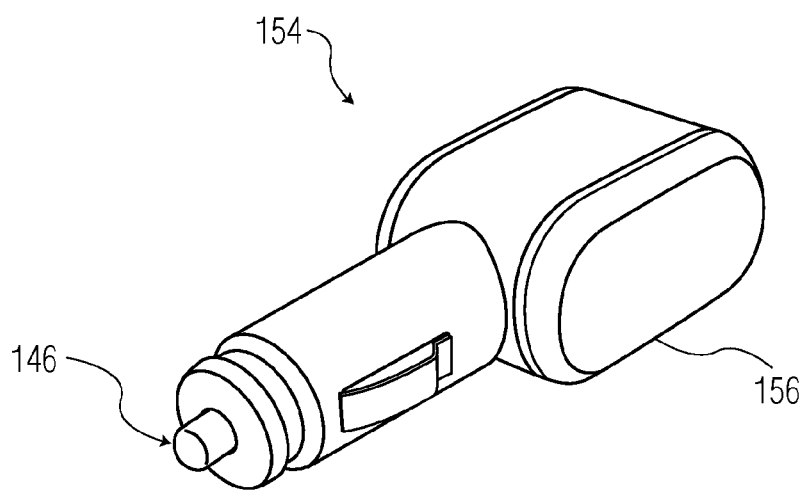
FIG. 5B depicts a perspective view of a standalone device, in which a sensor system is encased in a housing with the power interface exposed for insertion into a power-providing receptacle of an automobile.

In an embodiment, the sensor system 142 is a standalone device that is encased in a housing with the power interface exposed for easy insertion into a power-providing receptacle of the automobile. FIG. 5B depicts a perspective view of a standalone device 154, sometimes referred to as a "FOB," in which the sensor system is encased in a housing 156 with the power interface 146 exposed for insertion into a power-providing receptacle of an automobile. Because the sensor is a standalone device that can be easily inserted into a receptacle of the automobile, the sensor provides a simple-to-use and low-cost device that interfaces between the stimulus source and the smartphone to trigger the initiation of the App. Although the sensor system of FIGS. 5A and 5B includes a power interface, in other embodiments, the sensor system may include its own power source, such as a battery.

Figure 6:
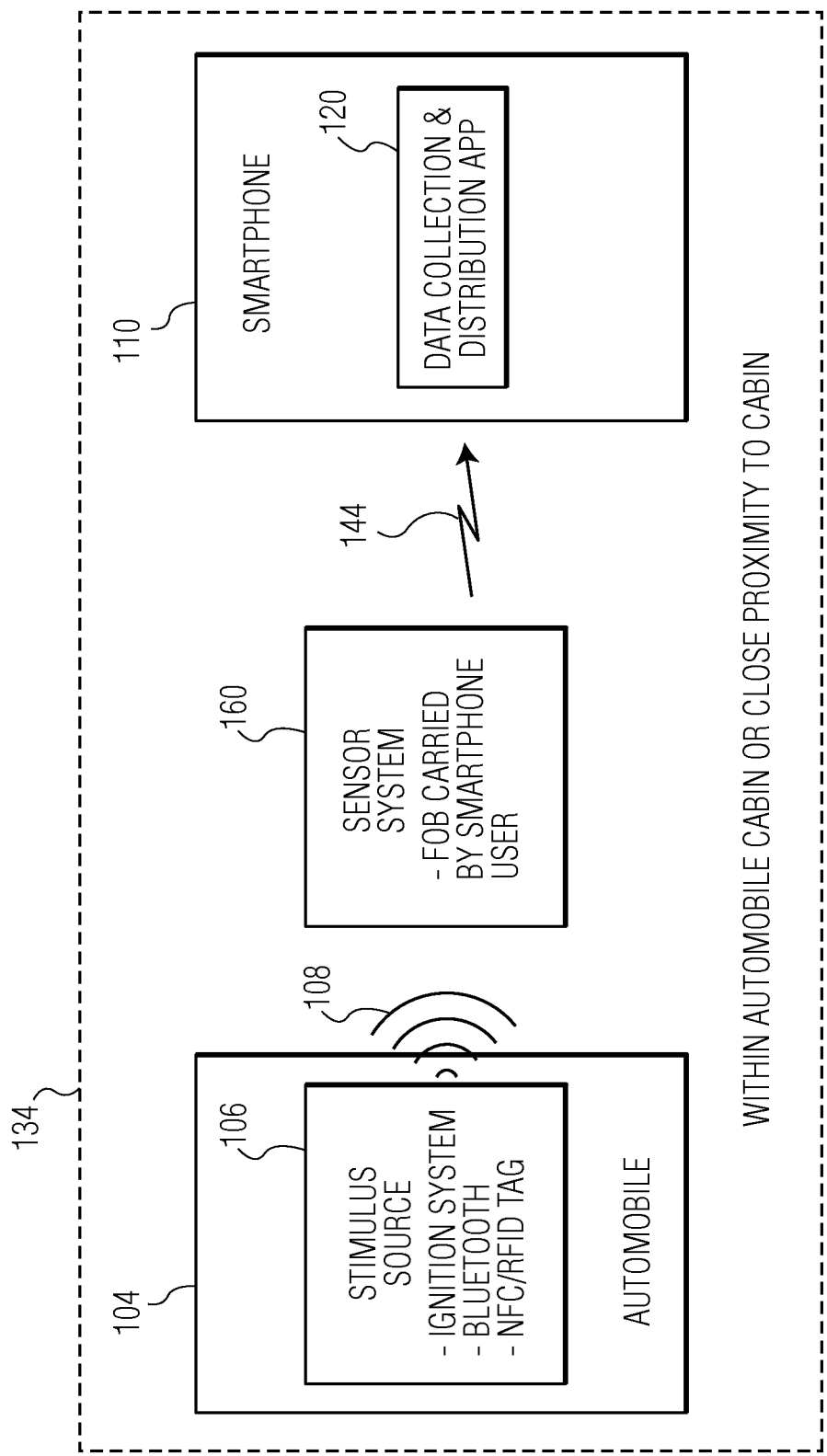
FIG. 6 illustrates a system in which a stimulus is detected by a sensor system that is external to a smartphone.

FIG. 6 illustrates a system in which the stimulus 108 is detected by a sensor system 160 that is external to the smartphone 110 but is not physically attached to the automobile 104 as in the embodiments of FIGS. 4, 5A, and 5B. In this embodiment, the sensor system is similar to the sensor system 142 of FIG. 5A except that the sensor system does not need to be engaged with a power receptacle of the automobile to function. For example, the sensor system may be a battery powered standalone device that is located within the cabin of the automobile so that the device can detect the stimulus. The standalone device could be carried by the user of the smartphone, for example, as a small device, sometimes referred to as a "FOB," on a keychain or simply left within the cabin of the automobile.

Figure 7:
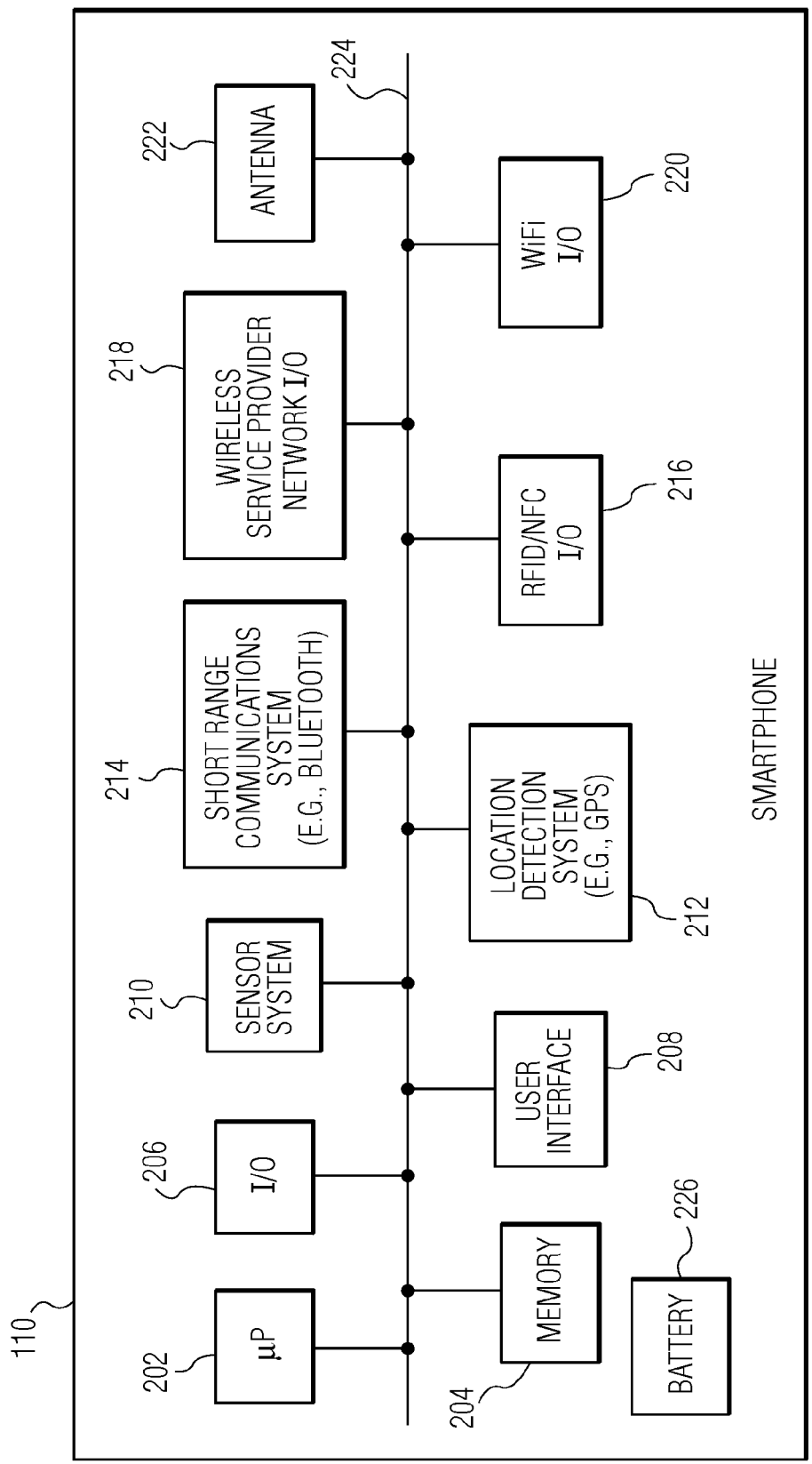
FIG. 7 depicts an embodiment of a smartphone.

As described above, the technique for collecting and distributing automobile-related travel data is particularly applicable to smartphones. FIG. 7 depicts an embodiment of the smartphone 110 from FIG. 1 with which the above-described technique can be implemented. The smartphone includes a microprocessor 202, memory 204 (both persistent/non-volatile and non-persistent/volatile), an input/output (I/O) 206, a user interface 208 (e.g., a touch screen, a physical keypad, an optical finger interface, speakers, and/or a microphone), a sensor system 210, a location detection system 212 (e.g., GPS), a short range communications system 214 (e.g., Bluetooth), a contactless communications I/O 216 (e.g., RFID or NFC), a wireless service provider network I/O 218 (e.g., GSM, CDMA, 3G, 4G, etc.), a Wi-Fi I/O 220 (e.g., IEEE 802.11), and an antenna 222 connected via a bus 224, and a battery 226. Many of the elements of a smartphone are well known in the field, and therefore and are not described further.

The smartphone typically runs an operating system, such as, for example, Android, iOS, Windows Phone, Symbian, or BlackBerry OS. It should be noted that the smartphone may or may not include the sensor system 130 as described above with reference to FIG. 2. Further, the sensor system 210 of the smartphone may include features of one or more of the other elements of the smartphone. For example, the sensor system may utilize the antenna to detect EMF or a microphone of the user interface to detect sound. Although the location detection system is described as a GPS system, in other embodiments, the location detection system may include an accelerometer or a triangulation system. Further, the location detection system may determine the location of the smartphone based on information from the wireless service provider network such as basestation information, or that determines the location of the smartphone from location information obtained from wireless access points such as Wi-Fi access points. The smartphone may also use other techniques to collect the automobile-related travel data. Additionally, in one embodiment, the App 120 is stored as microcode in a persistent memory of the smartphone and when initiated and running on the smartphone, the microcode is executed by the microprocessor.

Although the technique for collecting and distributing automobile-related travel data is described with reference to a smartphones, the technique is applicable to other handheld, mobile, and wireless communications devices. For example, the technique is applicable to pad or tablet devices or other personal wireless communications devices that are able to support the data collection and distribution application.

Figure 8:
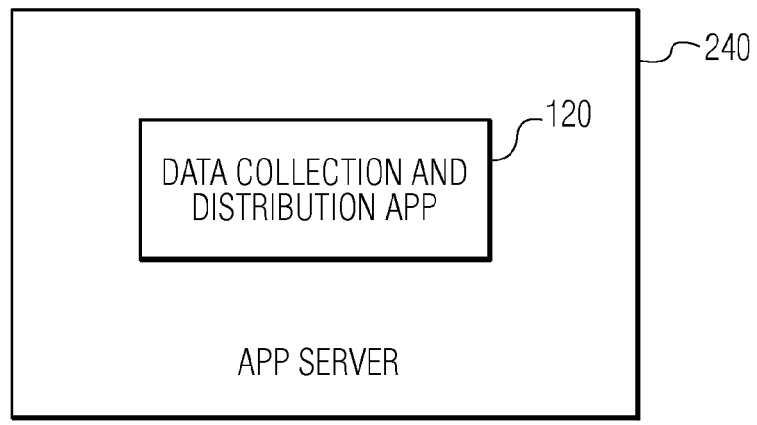
FIG. 8 depicts a server that stores a data collection and distribution application for distribution to smartphones.

In an embodiment, the App 120 can be stored on a server for download to the smartphone via, for example, an application store, or "App Store." FIG. 8 depicts a server 240, referred to as an "app server," that stores the App for distribution to smartphones. In an embodiment, the server is accessible from the smartphone 110 via a wireless link or a wired link. App servers are known in the field and are not described in detail herein. In an embodiment, the data collection and distribution app that is stored on the app server is configured to implement the data collection and distribution functions as described above. Additionally, the data collection and distribution app may include at least a portion of the sensor logic that is used to recognize the stimulus or to recognize a signal that is generated from the stimulus. For example, the data collection and distribution application may include sensor logic that is configured to recognize the signature of an EMF or of a series of sound waves that is generated by a stimulus source of an automobile.

As described with reference to FIG. 1, the smartphone 110 communicates automobile-related travel data to the recipient 116. In an embodiment, the smartphone sends raw location data to the recipient, including, for example, the longitude, latitude, and optionally elevation, of the smartphone. The raw GPS data can then be processed by the recipient as desired to produce data that is useful to the recipient. For example, the recipient can apply the location coordinates to map data to correlate the location of the smartphone relative to mapped landmarks such as roads, neighborhoods, cities, schools, etc. In another embodiment, the smartphone may process the location coordinates and provide processed data to the recipient. For example, the smartphone may process the raw coordinate data to reduce the volume of data and/or to transform the data to, for example, convert the coordinates to miles traveled and/or speed of travel information. The type of automobile-related travel data that is collected and the processing applied to the collected data can be customized to meet the needs of the recipient.

In an embodiment, the recipient 116 is a network connected device that is able to receive the automobile-related travel data that is communicated by the smartphone 110. For example, the recipient may be a computer server that is able to store and/or process the received automobile-related travel data. In another embodiment, the recipient is a mobile device such as a smartphone or a limited feature mobile phone that is able to receive the automobile-related travel data. The automobile-related travel data could be provided to a mobile device through, for example, email or through text messaging. Although some examples have been described, the protocols and data types that may be used to communicate the automobile-related travel data to the recipient depends on the particular implementation.

Figure 9:
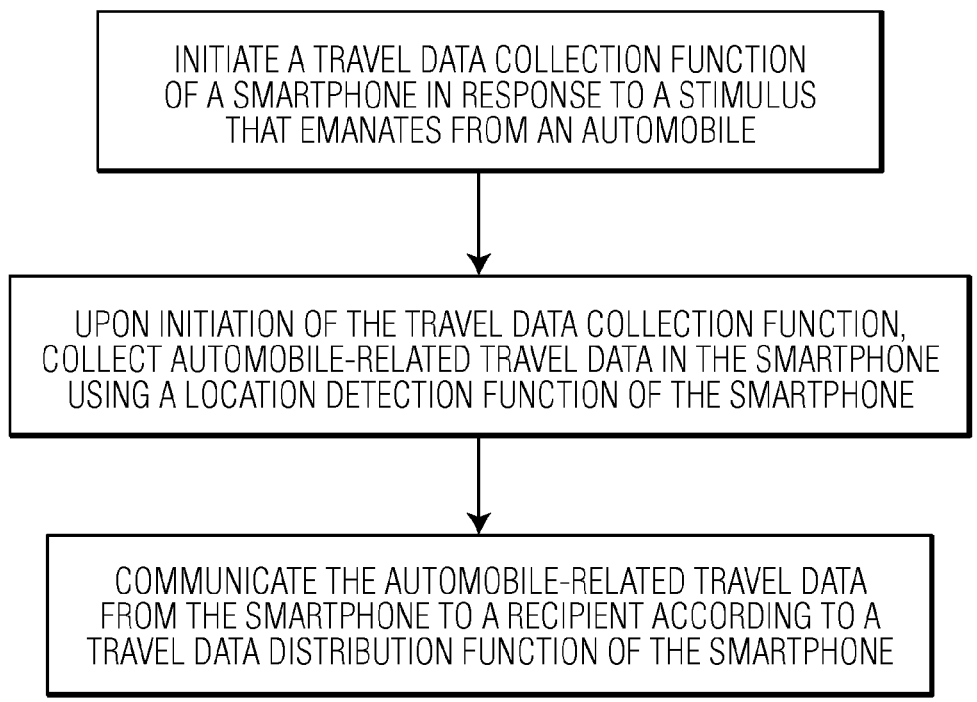
FIG. 9 is a process flow diagram of a method for collecting automobile-related travel data in accordance with an embodiment of the invention.

FIG. 9 is a process flow diagram of a method for collecting automobile-related travel data with a smartphone in accordance with an embodiment of the invention. At block 902 a travel data collection function of a smartphone is initiated in response to a stimulus that emanates from an automobile. At block 904 upon initiation of the travel data collection function, automobile-related travel data is collected in the smartphone using a location detection function of the smartphone. At block 906, the automobile-related travel data is communicated from the smartphone to a recipient according to a travel data distribution function of the smartphone.

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer readable storage medium for execution by a computer. As an example, an embodiment of a computer program product includes a computer readable storage medium to store a computer readable program that, when executed on a computer, causes the computer to perform operations, as described herein.

In some embodiments, the software portions are stored in a non-transitory state such that the software portions, or representations thereof, persist in the same physical location for a period of time. Additionally, in some embodiments the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Furthermore, embodiments of at least portions of the invention can take the form of a computer program product accessible from a computer-usable or computer-readable medium providing computer executable instructions, or program code, for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In an embodiment, the functionality of the data collection and distribution application is performed by a smartphone, which executes computer readable instructions. As described above, the data collection and distribution application may be stored on an application server for distribution to smartphones. In an embodiment, the server includes a processor, memory, and a communications interface as is known in the field. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory storage medium that stores computer executable instructions, which when executed by a computer, implement a method for collecting automobile-related travel data with a smartphone, the method comprising:
   initiating a travel data collection function of a smartphone in response to a stimulus that emanates from an automobile;
   upon initiation of the travel data collection function, collecting automobile-related travel data in the smartphone using a location detection function of the smartphone; and
   communicating the automobile-related travel data from the smartphone to a recipient according to a travel data distribution function of the smartphone;
   wherein the stimulus is at least one of an electromagnetic field generated from an ignition operation of the automobile and a series of sound waves generated from an ignition operation of the automobile.

2. The non-transitory storage medium of claim 1, wherein the travel data collection function and the travel data distribution function are managed by a travel data collection and distribution application that is resident on the smartphone.

3. The non-transitory storage medium of claim 2, wherein the method further comprises detecting an automobile identifier that corresponds to the automobile and initiating the travel data collection function of the smartphone only if the detected automobile identifier corresponds to an automobile identifier recognized by the travel data collection and distribution application.

4. The non-transitory storage medium of claim 1, wherein, at the smartphone, the electromagnetic field generated from the ignition operation of the automobile is detected, the method further comprising recognizing the electromagnetic field as the stimulus, and initiating the travel data collection function in response to detection of the electromagnetic field.

5. The non-transitory storage medium of claim 1, wherein, at the smartphone, the series of sound waves generated from an ignition operation of the automobile is detected, the method further comprising recognizing the series of sound waves as the stimulus, and initiating the travel data collection function in response to detection of the series of sound waves.

6. The non-transitory storage medium of claim 1, wherein the stimulus is related to a synchronization operation between an on-board communications system of the automobile and the smartphone.

7. The non-transitory storage medium of claim 1, wherein the stimulus is a wireless proximity signal generated by the automobile to indicate proximity to the automobile.

8. The non-transitory storage medium of claim 1, wherein the stimulus is communicated wirelessly from the automobile to the smartphone.

9. The non-transitory storage medium of claim 1, wherein the stimulus is communicated wirelessly to the smartphone from an RFID tag that is affixed to the automobile.

10. The non-transitory storage medium of claim 1, wherein the stimulus is communicated wirelessly to the smartphone from a NFC tag that is affixed to the automobile.

11. The non-transitory storage medium of claim 1, wherein the data collection function of the smartphone comprises a GPS module of the smartphone.

12. The non-transitory storage medium of claim 1, wherein the automobile-related travel data is at least one of location data, speed data, and time of day data.

13. The non-transitory storage medium of claim 1, wherein the automobile-related travel data is communicated from the smartphone to the recipient in real-time via a wireless service provider network input/output (I/O) of the smartphone.

14. The non-transitory storage medium of claim 1, wherein the automobile-related travel data is communicated from the smartphone to the recipient via a Wi-Fi I/O of the smartphone upon establishing a Wi-Fi connection between the smartphone and a wireless access point.

15. A method for collecting automobile-related travel data with a smartphone, the method comprising:
   initiating a travel data collection function of a smartphone in response to a stimulus that emanates from an automobile;
   upon initiation of the travel data collection function, collecting automobile-related travel data in the smartphone using a location detection function of the smartphone; and
   communicating the automobile-related travel data from the smartphone to a recipient according to a travel data distribution function of the smartphone;
   wherein the stimulus is at least one of an electromagnetic field generated from an ignition operation of the automobile and a series of sound waves generated from an ignition operation of the automobile.

16. A device for initiating the collection of automobile-related travel data with a smartphone, the device comprising:
   a sensor element configured to detect a stimulus that emanates from an automobile;
   sensor logic configured to recognize the stimulus; and
   a transmitter configured to wirelessly transmit an initiation signal to a smartphone in response to detecting and recognizing the stimulus, wherein the initiation signal initiates a travel data collection function in the smartphone;
   wherein the sensor logic is configured to recognize one of an EMF generated from an ignition operation of the automobile and a series of sound waves generated from an ignition operation of the automobile as a signal that should initiate the travel data collection function in the smartphone.

17. The device of claim 16, further comprising a housing and a receptacle interface, wherein the sensor element, the sensor logic, and transmitter are held by the housing and the receptacle interface is compatible with a power receptacle of an automobile.

* * * * *